(12) United States Patent
Waxman

(10) Patent No.: US 7,542,723 B2
(45) Date of Patent: Jun. 2, 2009

(54) DIRECT LINK ESTABLISHMENT IN WIRELESS NETWORKS

(75) Inventor: Shay Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 707 days.

(21) Appl. No.: 11/135,977

(22) Filed: May 24, 2005

(65) Prior Publication Data

US 2006/0270415 A1 Nov. 30, 2006

(51) Int. Cl.
*H04B 17/00* (2006.01)
(52) U.S. Cl. ............... 455/67.11; 455/67.13; 455/226.3

(58) Field of Classification Search ............ 455/67.11, 455/67.13, 226.1–226.3, 501, 63.1, 570, 455/114.2, 135, 278.1, 283, 296
See application file for complete search history.

(56) References Cited

U.S. PATENT DOCUMENTS 6,925,378 B2 * 8/2005 Tzamaloukas .............. 701/200

* cited by examiner

*Primary Examiner*—Eugene Yun
(74) *Attorney, Agent, or Firm*—Dana B. Lemoine; Lemoine Patent Services, PLLC

(57) ABSTRACT

A wireless station utilizes available metrics to determine whether to request a direct link with another wireless station.

8 Claims, 3 Drawing Sheets

DIRECT LINK ESTABLISHMENT IN WIRELESS NETWORKS

FIELD

The present invention relates generally to wireless networks, and more specifically to establishment of direct links between stations in wireless networks.

BACKGROUND

Wireless networks may include access points (APs) and wireless stations (STAs). Wireless stations may communicate with each other through an access point, or may communicate with each other directly using a direct link.

DESCRIPTION OF EMBODIMENTS

Figure 1:
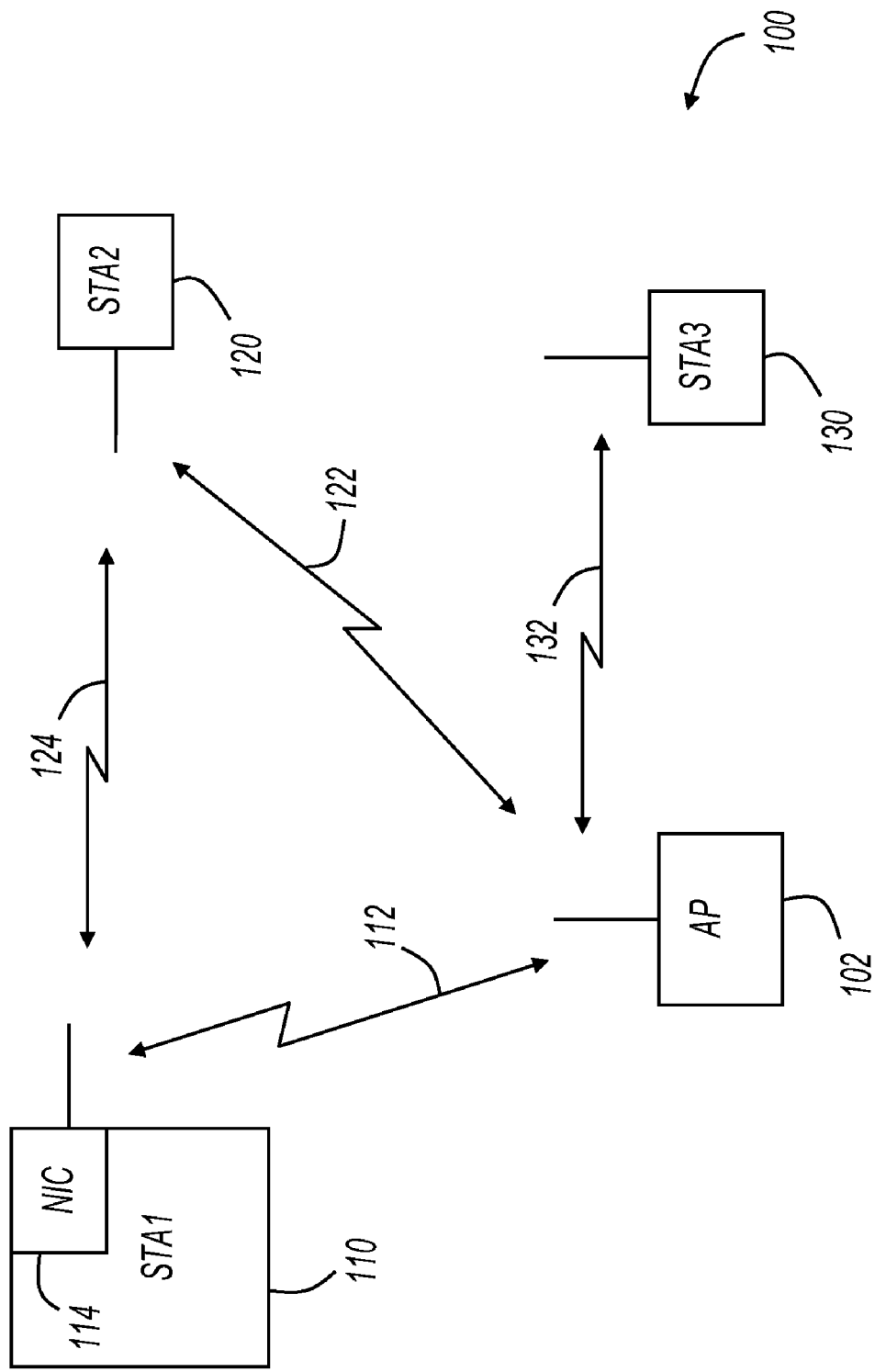
FIG. 1 shows a diagram of a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a wireless network. Wireless network 100 includes access point (AP) 102 and wireless stations (STA) 110, 120, and 130. In some embodiments, wireless network 100 is a wireless local area network (WLAN). For example, one or more of wireless stations 110, 120, and 130, or access point 102 may operate in compliance with a wireless network standard such as ANSI/IEEE Std. 802.11, 1999 Edition, although this is not a limitation of the present invention. Also for example, one or more of wireless stations 110, 120, 130, or access point 102 may operate in compliance with a wireless network standard having quality of service (QoS) extensions, such ANSI/IEEE Std. 802.11e. Further, one or more of wireless stations 110, 120, 130, or access point 102 may operate in compliance with a wireless network standard having spectrum and transmit power management extensions, such as ANSI/IEEE Std. 802.11h. As used herein, the term "802.11" refers to any past, present, or future IEEE 802.11 standard, including, but not limited to, the 1999 edition, 802.11e, and 802.11h.

Wireless stations 110, 120, and 130 may be any type of wireless station capable of communicating in network 100. For example, the wireless stations may be computers, personal digital assistants, wireless-capable cellular phones, or the like. As explained below, in some embodiments, wireless stations 110, 120, and 130 operate in compliance with an 802.11 standard having QoS extensions, and are capable of communicating with each other through access point 102 or directly through a "direct link."

Wireless station 110 includes network interface card (NIC) 114. In some embodiments, wireless station 110 may be a computer such as a notebook computer or a desktop computer that includes NIC 114. Wireless stations 120 and 130 are shown without NICs. In some embodiments, wireless stations 120 and 130 may be wireless devices that have built-in wireless capability. For example, wireless station 120 may be a notebook computer having a chipset with built-in wireless connectivity capability.

Access point 102 communicates with wireless station 110 (also referred to as "STA1") using signal 112. Access point 102 communicates with wireless station 120 (also referred to as "STA2") using signal 122, and access point 102 communicates with wireless station 130 (also referred to as "STA3") using signal 132. Each of the wireless stations may communicate with each other through the access point. For example, STA2 may communicate with STA3 through AP 102 using signals 122 and 132. Also for example, STA1 may communicate with STA2 through AP 102 using signals 112 and 122.

A wireless station may also communicate directly with another wireless station. For example, a direct link may be established between two wireless stations to bypass the access point. Such a direct link is shown by signal 124 between STA1 and STA2. In some embodiments, a direct link may be established in compliance with the IEEE 802.11e direct link protocol (DLP). Using DLP, a wireless station may request that a direct link be established with another wireless station. In various embodiments of the present invention, a wireless station may make a request for a direct link based on metrics available to the requesting wireless station. By requesting a direct link, the transmission rate between the two wireless stations may be increased, or the load on the access point may be decreased, or both.

Links represented by the various signals shown in FIG. 1 may have various transmission rates. For example, the link from STA1 to AP 102 represented by signal 112 may have a first transmission rate, referred to as "r1." Also for example, the link from AP 102 to STA2 may have a second transmission rate, referred to as "r2." In various embodiments of the present invention, a wireless station may request the establishment of a direct link based on values of r1 and r2.

Metrics other than r1 and r2 may also be used. For example, in various embodiments of the present invention, a wireless station may make use of metrics other than r1 and r2 when deciding whether to request a direct link. A wireless station may estimate a transmission rate that will result from a direct link, and may use the estimated transmission rate when deciding whether to request a direct link. A transmission rate of an unformed direct link may be estimated in many different ways.

In some embodiments, a wireless station may listen for a signal transmitted by another wireless station, and then measure characteristics of the signal to estimate a transmission rate that would result from a direct link with that wireless station. For example, while STA1 and STA2 are communicating through AP 102, STA1 may listen for signal 122 transmitted by STA2. If signal 122 is received by STA1, STA1 may measure a transmit power or a signal to noise ratio (SNR) of signal 122 transmitted by STA2, and then estimate a direct link transmission rate from the transmit power or SNR. For example, a direct link transmission rate may be estimated from SNR using Table 1 or a similar table of values.

TABLE 1

| SNR [dB] | Rate [Mbps] |
|---|---|
| <9 | 6 |
| >9 | 12 |
| >15 | 24 |
| >22 | 48 |

In some embodiments, a direct link transmission rate may be estimated from link margin information. For example, link margin information may be provided to STA1 from STA2 when both stations support the 802.11h transmit power control (TPC) service, and STA1 requests STA2 to provide the link margin.

In some embodiments, an estimated direct link transmission rate is used in combination with r1 and r2 (described above) when determining whether to request a direct link. For example, STA1 may request a direct link when the following inequality is satisfied:

$$\frac{1}{\text{RATE}(SNR)} < \frac{1}{r1} + \frac{1}{r2} \quad (1)$$

where RATE(SNR) is a transmission rate estimated from the signal to noise ratio, r1 is the transmission rate between the first wireless station and the access point, and r2 is the transmission rate between the second wireless station and the access point. Also for example, STA1 may request a direct link when the following inequality is satisfied:

$$\frac{1}{\text{RATE}(SNR)} \leq \frac{1}{r1} + \frac{1}{r2} \quad (2)$$

Figure 2:
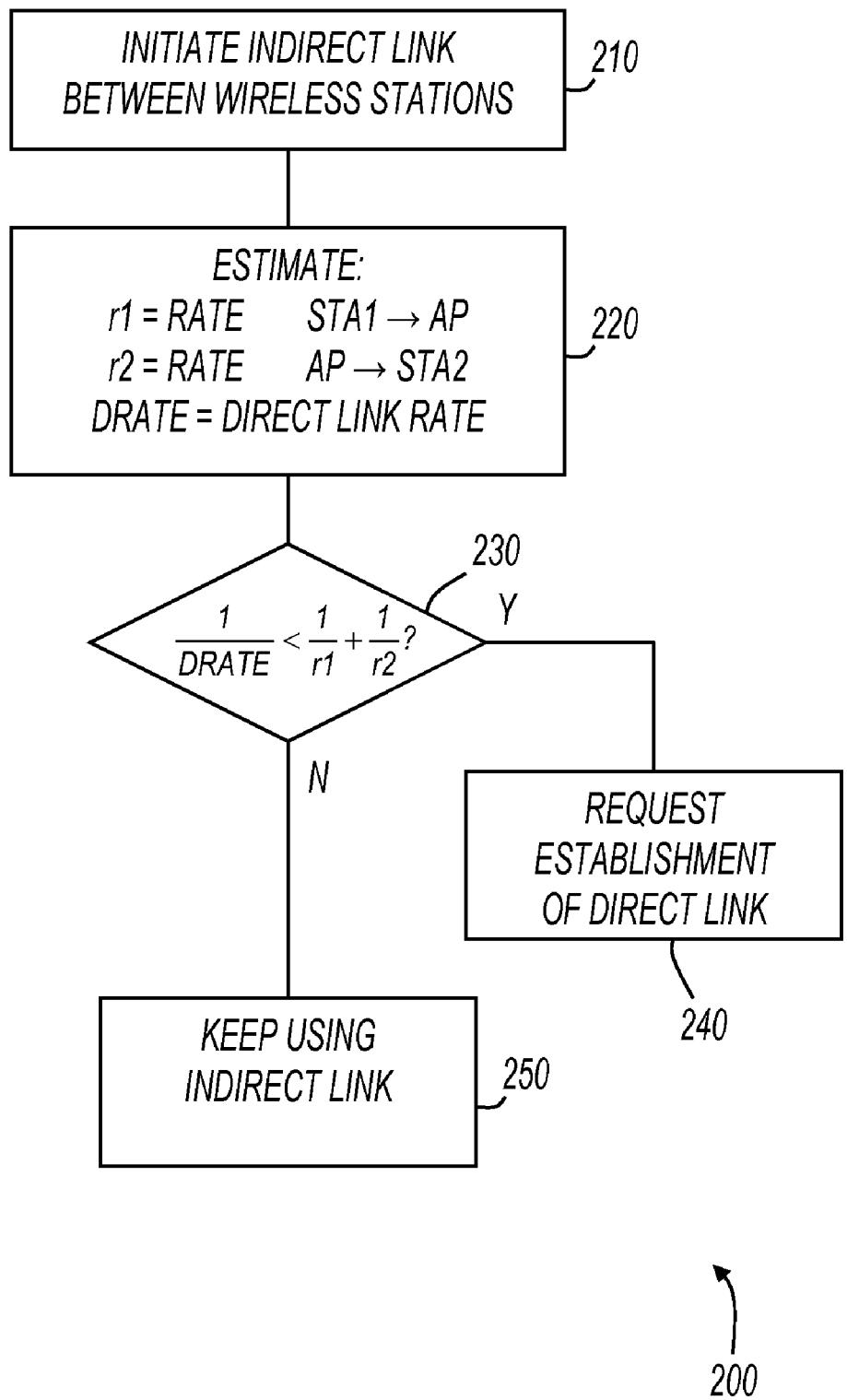
FIG. 2 shows a flowchart in accordance with various embodiments of the present invention.

FIG. 2 shows a flowchart in accordance with various embodiments of the present invention. In some embodiments, method 200, or portions thereof, is performed by a wireless station, embodiments of which are shown in the various figures. In other embodiments, method 200 is performed by a network interface card (NIC), a processor, an integrated circuit or an electronic system. Method 200 is not limited by the particular type of apparatus performing the method. The various actions in method 200 may be performed in the order presented, or may be performed in a different order. Further, in some embodiments, some actions listed in FIG. 2 are omitted from method 200.

Method 200 is shown beginning with block 210 in which an indirect link is established. For example, STA1 may establish an indirect link with STA2 through AP 102. At 220, various transmission rates are estimated. For example, a transmission rate from STA1 to the AP (r1) is estimated, a transmission rate from the AP to STA2 (r2) is estimated, and a direct link transmission rate (DRATE) is estimated.

The DRATE may be estimated using a signal received by STA1. For example, STA1 may receive a signal transmitted by STA2 that was intended for the AP. STA1 may then measure or estimate a characteristic of the signal, such as transmit power or signal to noise ratio (SNR). DRATE may be estimated from SNR using a table of values such as Table 1 shown above. For example, DRATE may be found as RATE(SNR) as described above in inequalities (1) and (2). The DRATE may also be estimated from a link margin provided to STA1 by STA2 through the indirect link.

At 230, the following inequality is tested:

$$\frac{1}{DRATE} < \frac{1}{r1} + \frac{1}{r2}$$

If the inequality is not satisfied, then STA1 may continue to use the indirect link, which is shown at 250. If the inequality is satisfied, then STA1 may request establishment of a direct link at 240. The request may be made using an IEEE 802.11e DLP request. For example, the wireless stations and access point may form a quality of service basic service set (QBSS), and STA1 may make a request using the DLP services in compliance with IEEE 802.11e.

In some embodiments, a different inequality is tested. For example, at 230, the following inequality may be tested:

$$\frac{1}{DRATE} \leq \frac{1}{r1} + \frac{1}{r2}$$

As shown in FIG. 2, metrics available to a wireless station are utilized to determine whether to request a direct link, and example inequalities are presented that utilize example metrics for the decision. Other metrics and other inequality tests may be utilized without departing from the scope of the present invention.

Figure 3:
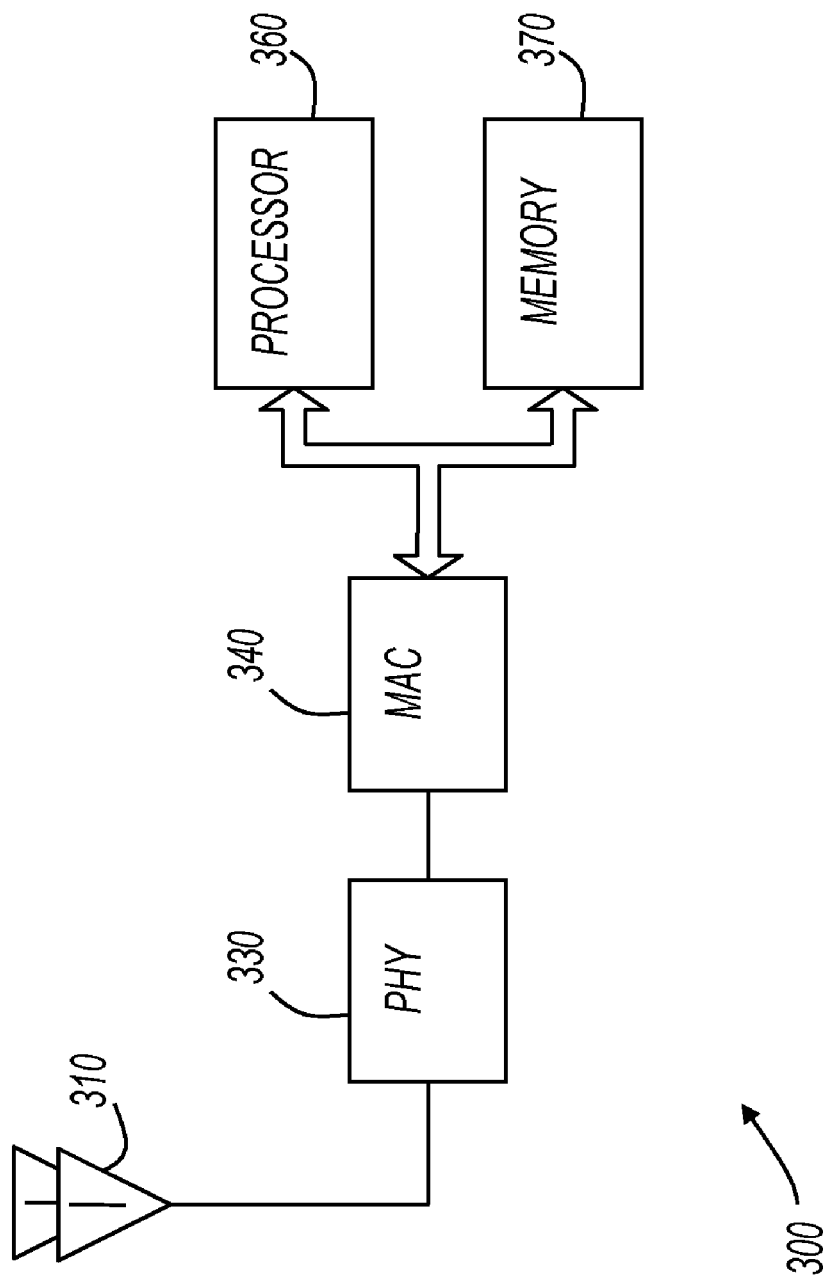
FIG. 3 shows a system diagram in accordance with various embodiments of the present invention.

FIG. 3 shows a system diagram in accordance with various embodiments of the present invention. Electronic system 300 includes antennas 310, physical layer mechanism (PHY) 330, media access control (MAC) mechanism 340, processor 360, and memory 370. In some embodiments, electronic system 300 may be a wireless station, a wireless interface, a NIC, or the like. For example, electronic system 300 may be utilized in network 100 as any of wireless stations 110, 120, or 130, or NIC 114. Also for example, electronic system 300 may be an apparatus capable of performing any of the method embodiments described with reference to the previous figures.

In some embodiments, electronic system 300 may represent a system that includes a wireless interface as well as other circuits. For example, in some embodiments, electronic system 300 may be a computer, such as a personal computer, a workstation, or the like, that includes a wireless interface as a peripheral or as an integrated unit.

In operation, system 300 sends and receives signals using antennas 310, and the signals are processed by the various elements shown in FIG. 3. Antennas 310 may include one or more directional antennas or one or more omni-directional antennas. As used herein, the term omni-directional antenna refers to any antenna having a substantially uniform pattern in at least one plane. For example, in some embodiments, antennas 310 may include an omni-directional antenna such as a dipole antenna, or a quarter wave antenna. Also for example, in some embodiments, antennas 310 may include a directional antenna such as a parabolic dish antenna or a Yagi antenna. In some embodiments, antennas 310 form an array capable of supporting spatial division multiple access (SDMA) or multiple-input multiple output (MIMO) communications. In other embodiments, antennas 310 include only one physical antenna.

Physical layer mechanism (PHY) 330 may be any suitable physical layer implementation. For example, PHY 330 may be a circuit block that implements a physical layer that complies with an IEEE 802.11 standard or other standard. Examples include, but are not limited to, direct sequence spread spectrum (DSSS), frequency hopping spread spectrum (FHSS), and orthogonal frequency division multiplexing (OFDM). PHY 330 is coupled to antennas 310 to interact with a wireless network. PHY 330 may include circuitry to support the transmission and reception of radio frequency (RF) signals. For example, in some embodiments, PHY 330 includes an RF receiver to receive signals and perform "front end" processing such as low noise amplification (LNA), filtering, frequency conversion or the like. Further, in some embodiments, PHY 330 includes beamforming circuitry to support SDMA processing. Also for example, in some embodiments, PHY 330 includes circuits to support frequency up-conversion, and an RF transmitter. The various embodiments of the invention are not limited by the contents or function of PHY 330.

Media access control (MAC) mechanism 340 may be any suitable media access control layer implementation. For example, MAC 340 may be implemented in software, or hardware or any combination thereof. In some embodiments, a portion of MAC 340 may be implemented in hardware, and a portion may be implemented in software that is executed by processor 360. Further, MAC 340 may include a processor separate from processor 360.

Processor 360 may perform method embodiments of the present invention, such as method 200 (FIG. 2). Processor 360 represents any type of processor, including but not limited to, a microprocessor, a digital signal processor, a microcontroller, or the like.

Memory 370 represents an article that includes a machine readable medium. For example, memory 370 represents a random access memory (RAM), dynamic random access memory (DRAM), static random access memory (SRAM), read only memory (ROM), flash memory, or any other type of article that includes a medium readable by processor 360. Memory 370 may store instructions for performing the execution of the various method embodiments of the present invention.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   measuring a signal to noise ratio of a signal received at a first wireless station, wherein the signal is transmitted to an access point from a second wireless station; and
   making a request for establishment of a direct link between the first and second wireless stations based on the signal to noise ratio, wherein making a request for establishment of a direct link comprises making the request when:

$$\frac{1}{RATE(SNR)} < \frac{1}{r1} + \frac{1}{r2}$$

where RATE(SNR) is a transmission rate estimated from the signal to noise ratio, r1 is a transmission rate between the first wireless station and the access point, and r2 is a transmission rate between the second wireless station and the access point.

2. The method of claim 1 wherein making a request for establishment of a direct link comprises making a request compliant with IEEE 802.11e direct link protocol.

3. A method comprising:
   measuring a signal to noise ratio of a signal received at a first wireless station, wherein the signal is transmitted to an access point from a second wireless station; and
   making a request for establishment of a direct link between the first and second wireless stations based on the signal to noise ratio, wherein making a request for establishment of a direct link further comprises making the request when:

$$\frac{1}{RATE(SNR)} \leq \frac{1}{r1} + \frac{1}{r2}$$

where RATE(SNR) is a transmission rate estimated from the signal to noise ratio, r1 is a transmission rate between the first wireless station and the access point, and r2 is a transmission rate between the second wireless station and the access point.

4. The method of claim 3 wherein making a request for establishment of a direct link comprises making a request compliant with IEEE 802.11e direct link protocol.

5. An apparatus with a machine accessible medium having instructions stored thereon that when accessed result in a machine performing:
   measuring a signal to noise ratio of a signal received at a first wireless station, wherein the signal is transmitted to an access point from a second wireless station; and
   making a request for establishment of a direct link between the first and second wireless stations based on the signal to noise ratio, wherein making a request for establishment of a direct link further comprises making the request when:

$$\frac{1}{RATE(SNR)} < \frac{1}{r1} + \frac{1}{r2}$$

where RATE(SNR) is a transmission rate estimated from the signal to noise ratio, r1 is a transmission rate between the first wireless station and the access point, and r2 is a transmission rate between the second wireless station and the access point.

6. The apparatus of claim 5 wherein making a request for establishment of a direct link comprises making a request compliant with IEEE 802.11e direct link protocol.

7. An apparatus with a machine accessible medium having instructions stored thereon that when accessed result in a machine performing:
   measuring a signal to noise ratio of a signal received at a first wireless station, wherein the signal is transmitted to an access point from a second wireless station; and
   making a request for establishment of a direct link between the first and second wireless stations based on the signal to noise ratio, wherein making a request for establishment of a direct link further comprises making the request when:

$$\frac{1}{RATE(SNR)} \leq \frac{1}{r1} + \frac{1}{r2}$$

where RATL(SNR) is a transmission rate estimated from the signal to noise ratio, r1 is a transmission rate between the first wireless station and the access point, and r2 is a transmission rate between the second wireless station and the access point.

8. The apparatus of claim 7 wherein making a request for establishment of a direct link comprises making a request compliant with IEEE 802.11e direct link protocol.

* * * * *

UNITED STATES PATENT AND TRADEMARK OFFICE
CERTIFICATE OF CORRECTION

PATENT NO. : 7,542,723 B2 Page 1 of 1
APPLICATION NO. : 11/135977
DATED : June 2, 2009
INVENTOR(S) : Shay Waxman It is certified that error appears in the above-identified patent and that said Letters Patent is hereby corrected as shown below:

In column 6, line 58, in Claim 7, delete "RATL(SNR)" and insert -- RATE(SNR) --, therefor.

Signed and Sealed this

Eleventh Day of August, 2009

David J. Kappos
*Director of the United States Patent and Trademark Office*